United States Patent
Begic et al.

(10) Patent No.: US 9,678,588 B2
(45) Date of Patent: Jun. 13, 2017

(54) WIRE-BONDED BORDERLESS DISPLAY

(71) Applicant: Sony Mobile Communications Inc., Tokyo (JP)

(72) Inventors: Stjepan Begic, Bunkeflostrand (SE); Olof Simonsson, Dalby (SE); Magnus Steijner, Loddekopinge (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 108 days.

(21) Appl. No.: 14/607,212

(22) Filed: Jan. 28, 2015

(65) Prior Publication Data

US 2016/0216814 A1   Jul. 28, 2016

(51) Int. Cl.

| | | |
|---|---|---|
| *G06F 3/041* | (2006.01) | |
| *G06F 3/044* | (2006.01) | |
| *G02F 1/1333* | (2006.01) | |
| *G02F 1/1335* | (2006.01) | |
| *G02F 1/1368* | (2006.01) | |
| *G02F 1/1362* | (2006.01) | |
| *G02F 1/1345* | (2006.01) | |

(52) U.S. Cl.
CPC .......... *G06F 3/0412* (2013.01); *G02F 1/1368* (2013.01); *G02F 1/13338* (2013.01); *G02F 1/13452* (2013.01); *G02F 1/133305* (2013.01); *G02F 1/133514* (2013.01); *G02F 1/136286* (2013.01); *G06F 3/044* (2013.01); *G06F 3/0416* (2013.01); *G02F 2201/42* (2013.01); *G02F 2201/56* (2013.01)

(58) Field of Classification Search
CPC .......... G02F 1/13338; G02F 1/133514; G02F 1/13452; G02F 1/136286; G02F 2201/42; G02F 2201/56; G06F 3/0412; G06F 3/0416; G06F 3/044
See application file for complete search history.

(56) References Cited

U.S. PATENT DOCUMENTS

| | | |
|---|---|---|
| 6,661,399 B1 | 12/2003 | Oh et al. |
| 8,275,327 B2 | 9/2012 | Yi et al. |
| 8,390,757 B2 | 3/2013 | Kim et al. |
| 8,432,523 B2 | 4/2013 | Shin et al. |
| 8,773,847 B2 | 7/2014 | Byun et al. |

(Continued)

OTHER PUBLICATIONS

International Search Report and Written Opinion for International Application No. PCT/US2015/038036 dated Sep. 30, 2015.

*Primary Examiner* — Viet Pham

(74) *Attorney, Agent, or Firm* — Tucker Ellis LLP

(57) ABSTRACT

An LCD module may include a color filter (CF) layer with pixels for modifying light energy to form a display image. A transistor layer below the CF layer may include a glass panel, conductive pathways, and transistors coupled to the conductive pathways and for controlling the pixels. A control layer is located below the transistor layer and may include a display controller for generating signals to control the transistor. First wire bondings carry the signals between the display controller and the conductive pathways included in the transistor layer. The LCD module may be used in a substantially round device, such as a watch, to provide a substantially borderless display.

17 Claims, 12 Drawing Sheets

(56) References Cited

U.S. PATENT DOCUMENTS

| | | | |
|---|---|---|---|
| 2004/0090584 A1* | 5/2004 | Mai | G02F 1/13452 349/149 |
| 2013/0088671 A1 | 4/2013 | Drzaic et al. | |
| 2013/0328051 A1* | 12/2013 | Franklin | H01L 29/786 257/59 |
| 2014/0063393 A1 | 3/2014 | Zhong et al. | |
| 2014/0347318 A1 | 11/2014 | Kim | |
| 2014/0362544 A1 | 12/2014 | Han et al. | |
| 2015/0012877 A1 | 1/2015 | Lee et al. | |

* cited by examiner

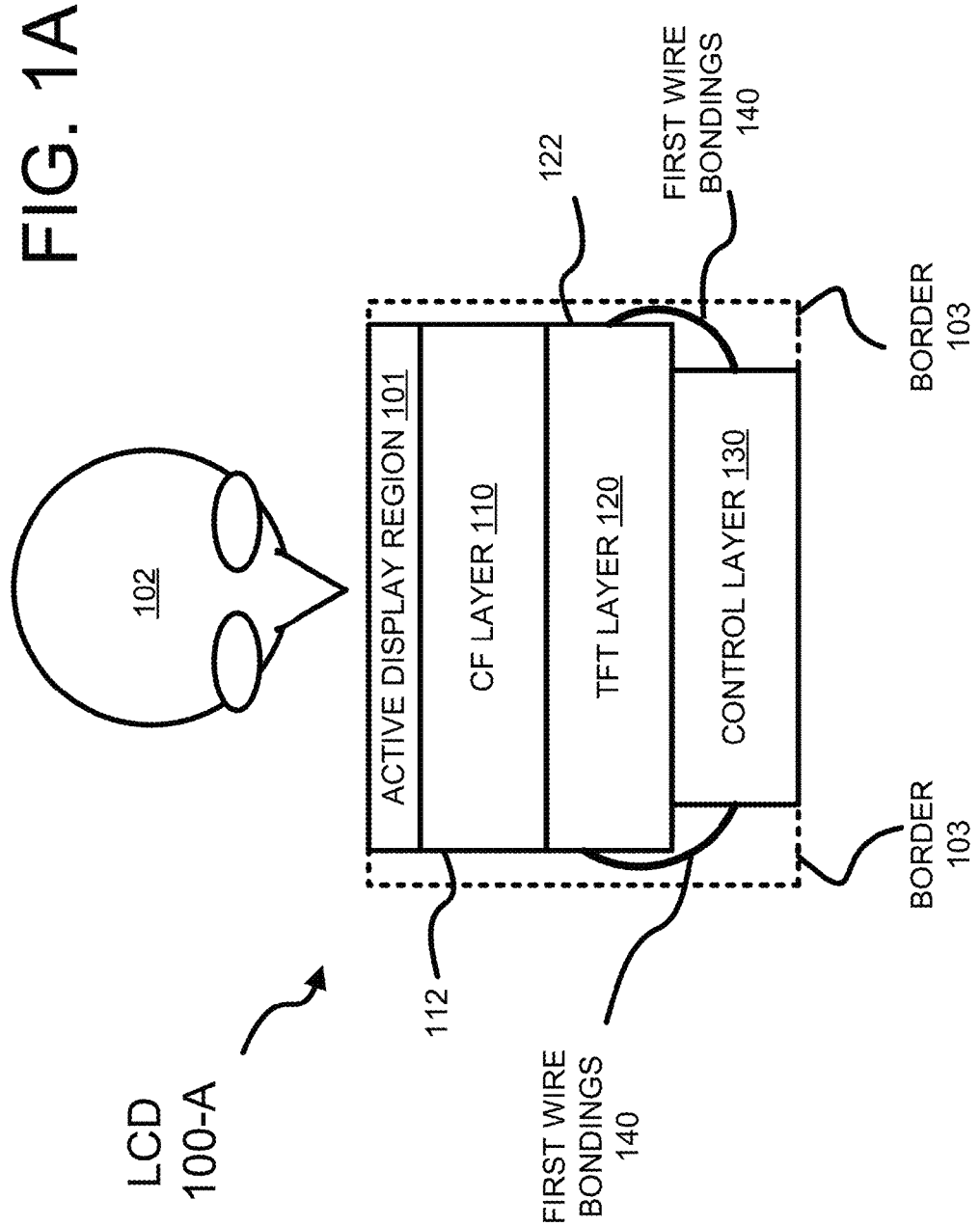

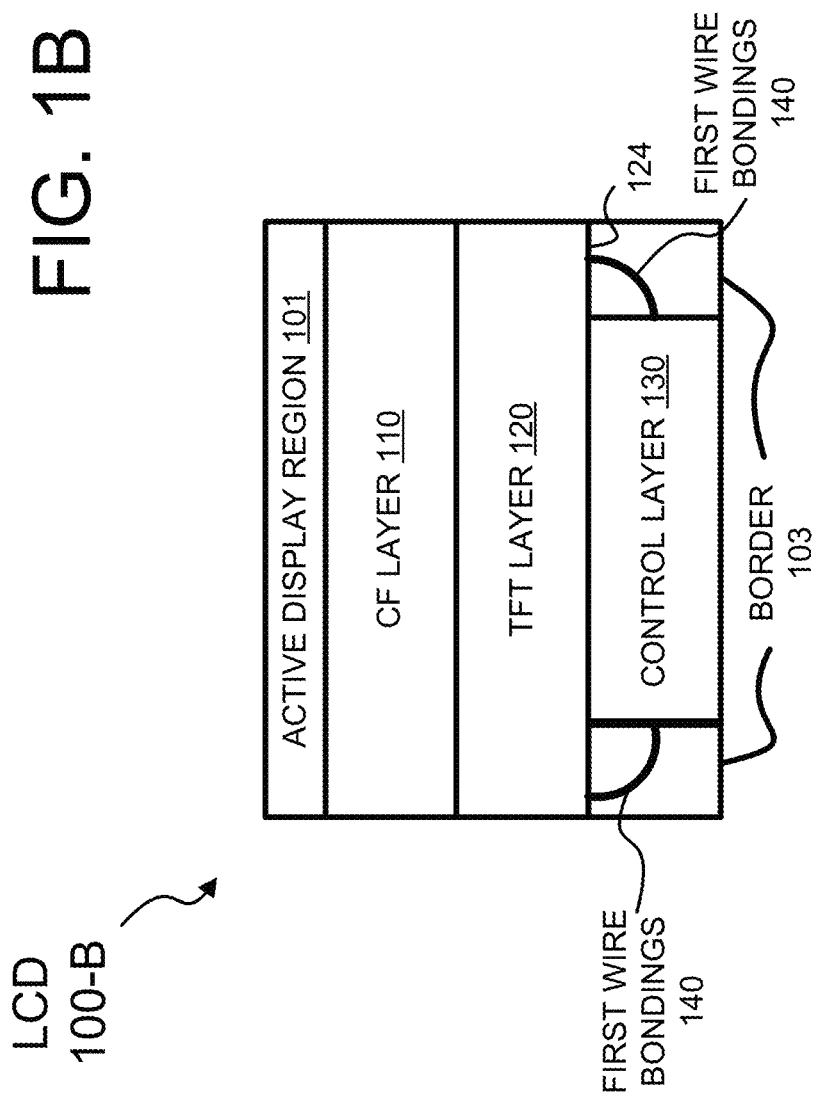

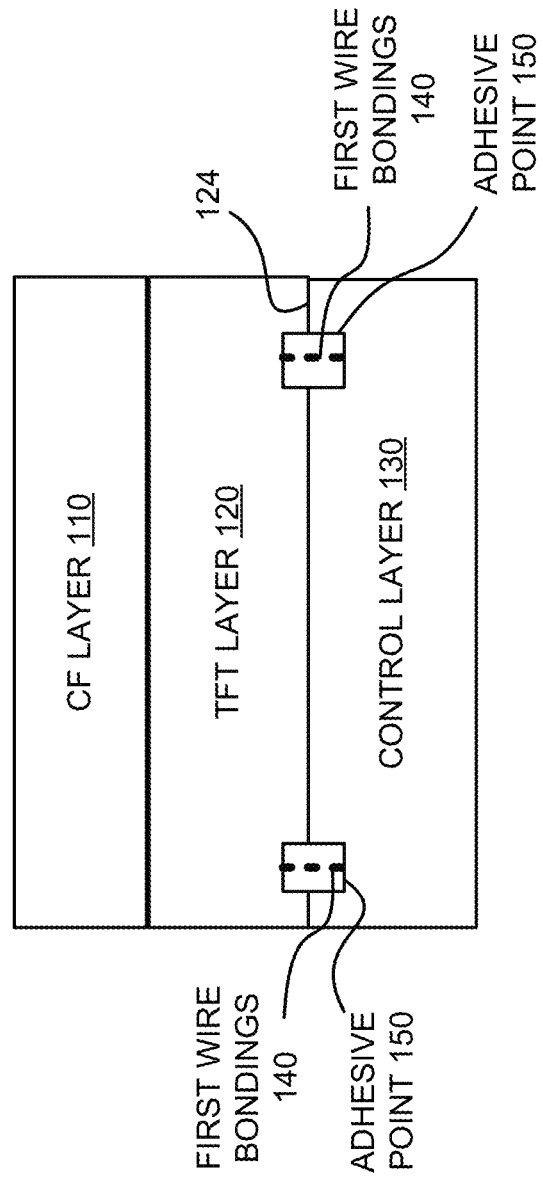

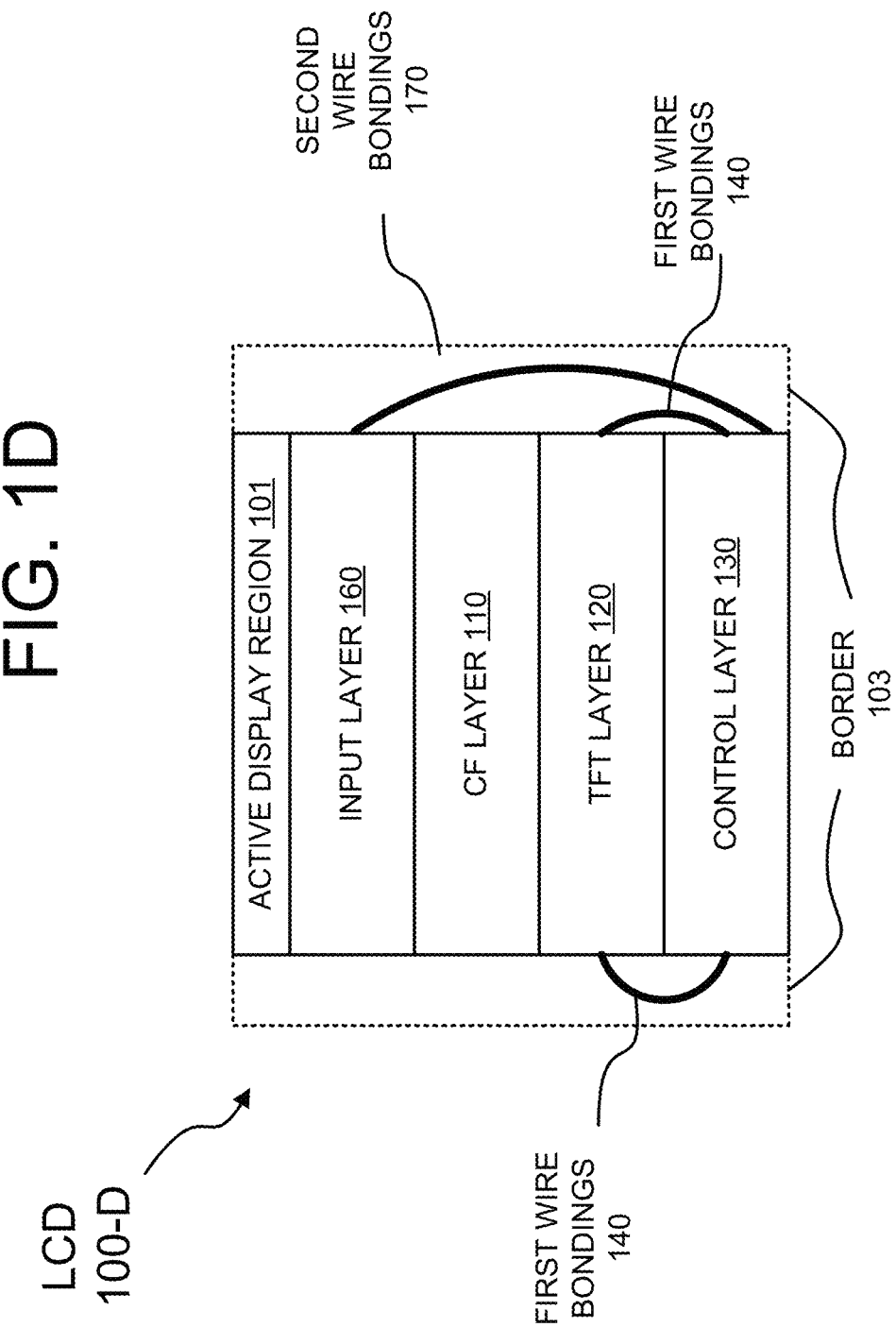

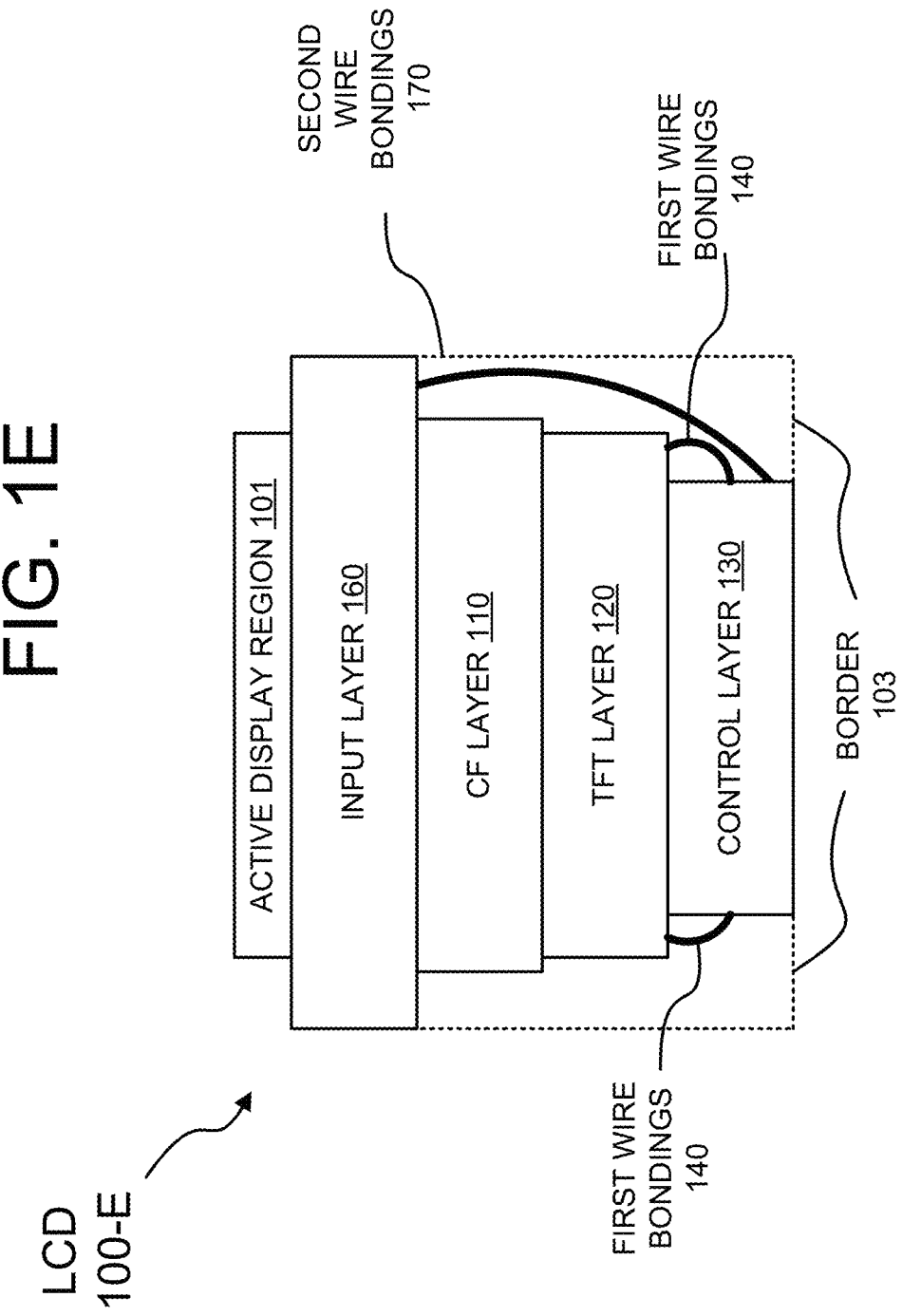

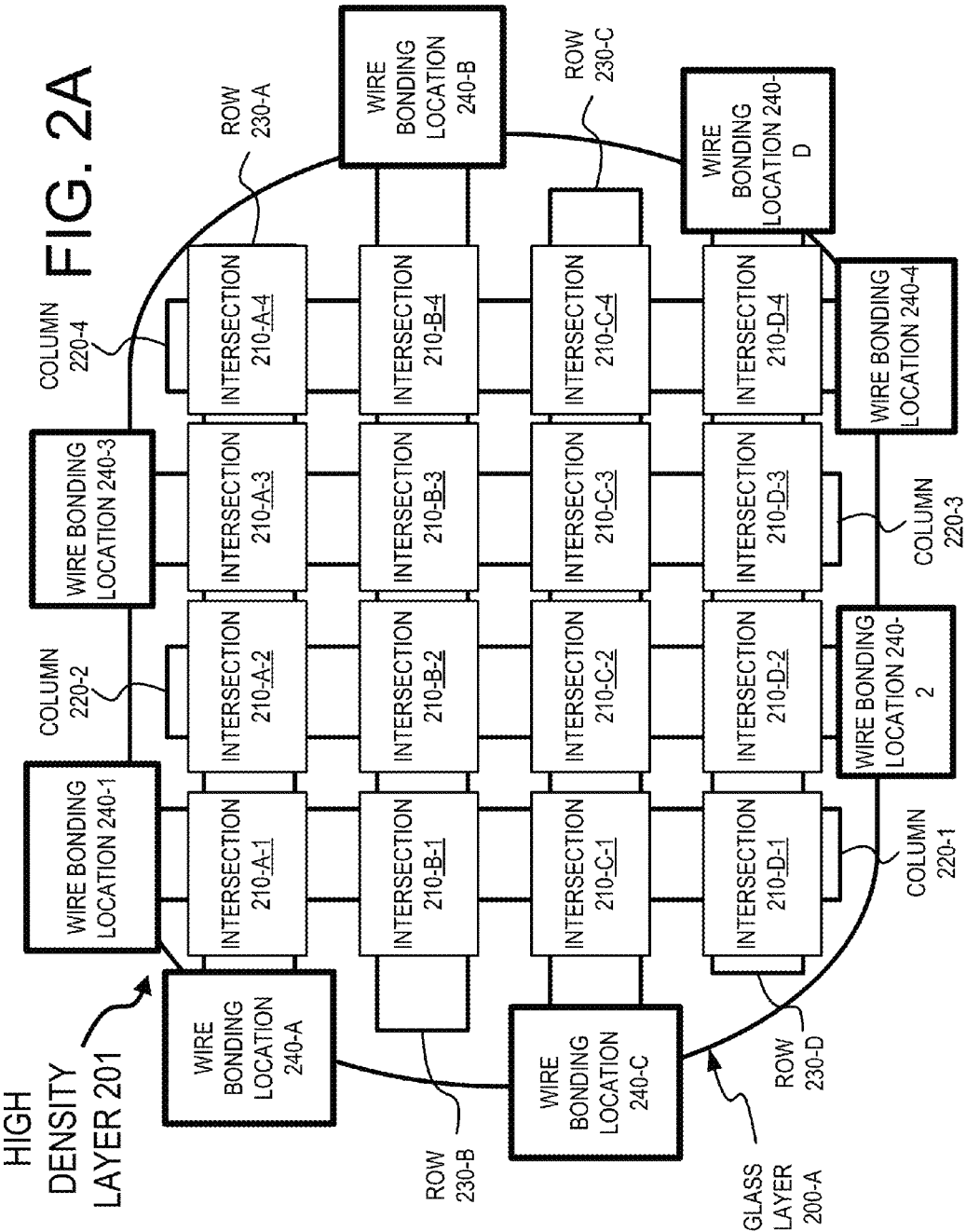

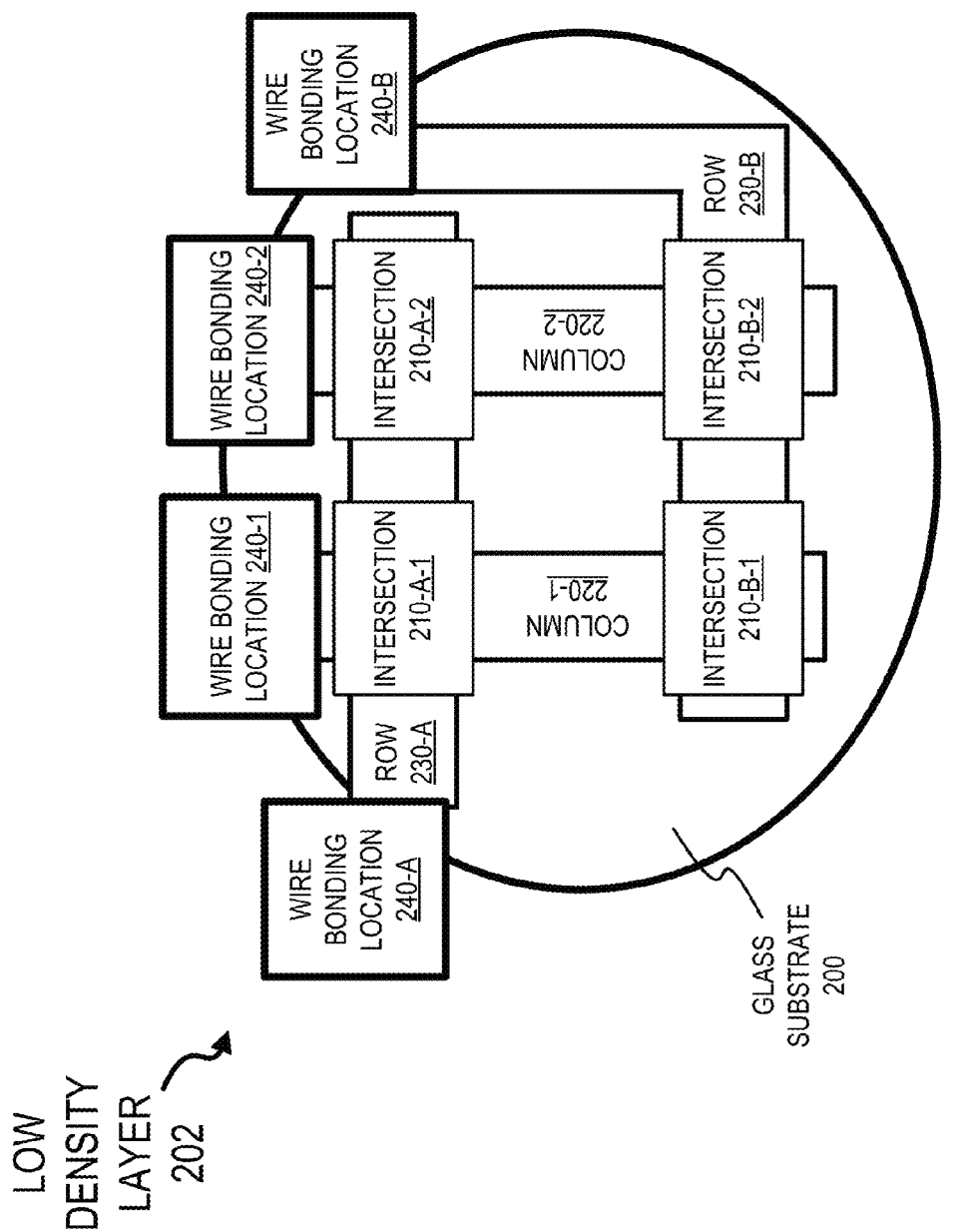

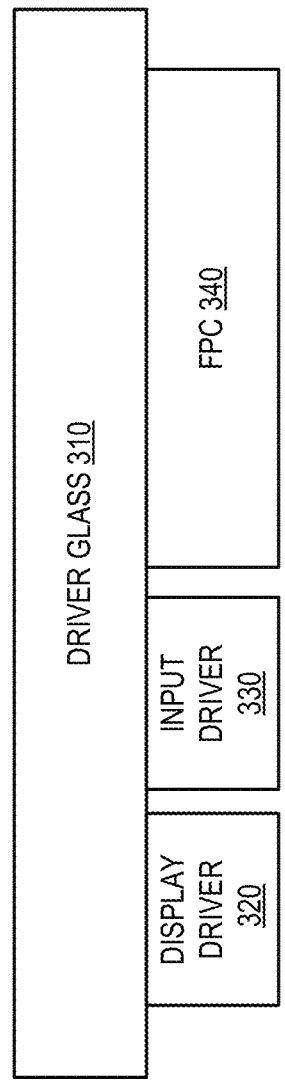

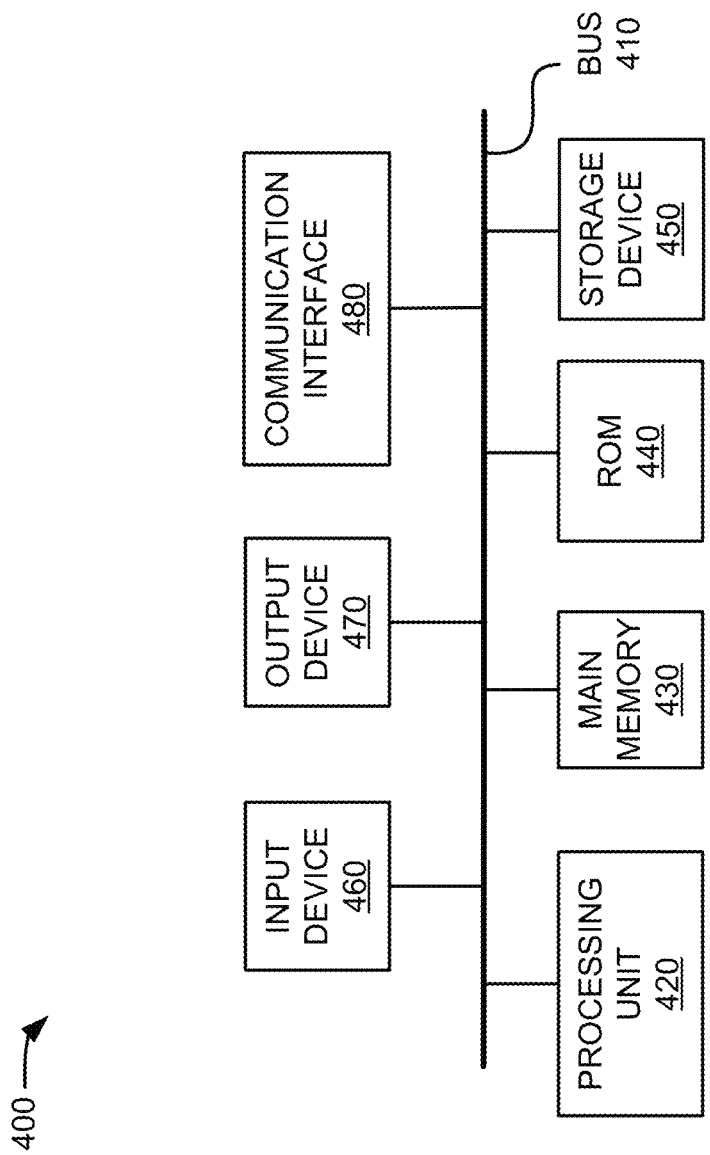

WIRE-BONDED BORDERLESS DISPLAY

TECHNICAL FIELD OF THE INVENTION

The invention generally relates to a configuration for a display device.

DESCRIPTION OF RELATED ART

Liquid crystal display (LCD) modules are commonly used in a variety of consumer electronics devices such as televisions, computer monitors, laptop computers, gaming devices, personal user devices, and smart phones. An LCD module may include may include, for example, a color filter (CF) glass layer which controls different colored pixels to modify light output of a light source, such as a backlight or an emissive light, and a thin film transistor (TFT) glass layer that includes a matrix of transistors that are selectively activated to control the color pixels within the CF layer. The LCD module may further include electronics, such as integrated chips and flexible printed circuits, to drive and/or manage drive signals for controlling individual transistors of the TFT glass layer. The LCD module may include additional electronics to perform other functions, such as to enable a touch-sensitive sensor layer.

These electronics may be mounted on a peripheral portion of the TFT glass layer, and a protective material may be placed over the electronics to cover and protect the electronics. However, the protective materials may add unwanted thickness to the device and/or may be aesthetically unpleasing. For example, a circular LCD module may include an annular outer bezel or a circular segment covering the electronics, thereby reducing the potential display area for the LCD module.

SUMMARY

According to one aspect, a device is provided. The device may include a color filter (CF) layer that includes a plurality of pixels mounted to the first glass panel, wherein the plurality of pixels are configured to modify light energy to form a display image; a transistor layer that includes a first glass panel, conductive pathways, and a plurality of transistors coupled to the conductive pathways, wherein the plurality of transistors are configured to control the plurality of pixels; a control layer located below the transistor layer, wherein the control layer includes a display controller configured to generate signals to control the plurality of transistors; and first wire bondings configured to carry the signals between the display controller and the conductive pathways included in the transistor layer.

According to another aspect, a user device is provided. The user device may include a display module, wherein the display module includes a color filter (CF) layer that includes a first glass panel and a plurality of pixels coupled to the first glass panel, wherein the plurality of pixels form a display, a transistor layer that includes a second glass panel, conductive pathways, and a plurality of transistors coupled to the conductive pathways, wherein the plurality of transistors are configured to control the plurality of pixels, a control layer located below the transistor layer, wherein the control layer includes a display controller configured to generate signals to selectively activate the plurality of transistors, and first wire bondings configured to carry the signals between the display controller and the conductive pathways included in the transistor layer. The user device may further include an enclosure to house the display module.

According to one aspect, a device is provided. The device may include an input layer configured to generate signals associated with a user input; a color filter (CF) layer that includes a plurality of pixels mounted to the first glass panel, wherein the plurality of pixels are configured to modify light energy to form a display image, and wherein the CF layer is located below the input layer; a transistor layer that includes a first glass panel, conductive pathways, and a plurality of transistors coupled to the conductive pathways, wherein the plurality of transistors are configured to control the plurality of pixels; a control layer located below the transistor layer, wherein the control layer includes a display controller configured to generate signals to control the plurality of transistors; first wire bondings configured to carry the signals between the display controller and the conductive pathways included in the transistor layer, wherein the first wire bondings extend radially around the perimeter of the transistor layer; and second wire bondings configured to carry the signals between the input layer and the control layer, wherein the second wire bondings extend radially from a portion of a perimeter of the input layer.

BRIEF DESCRIPTION OF THE DRAWINGS

FIGS. 1A-1E show cross-sectional views of liquid crystal display (LCD) modules in which concepts described herein may be implemented;

FIG. 2A shows a top view of a high density layer that may be included in the LCD module of FIGS. 1A-1D;

FIG. 2B shows a top view of a low density layer that may be included in the LCD module of FIGS. 1A-1D;

FIG. 3A show a cross-sectional view of a control layer that may be included in the LCD module of FIGS. 1A-1D according to one implementation;

FIG. 4 shows a diagram of exemplary components of a device that may include the LCD module of FIGS. 1A-1D; and FIG. 5 shows an exemplary user device, such as a watch, that may include the LCD module of FIGS. 1A-1D.

DETAILED DESCRIPTION OF PREFERRED EMBODIMENTS

Figure 3B:
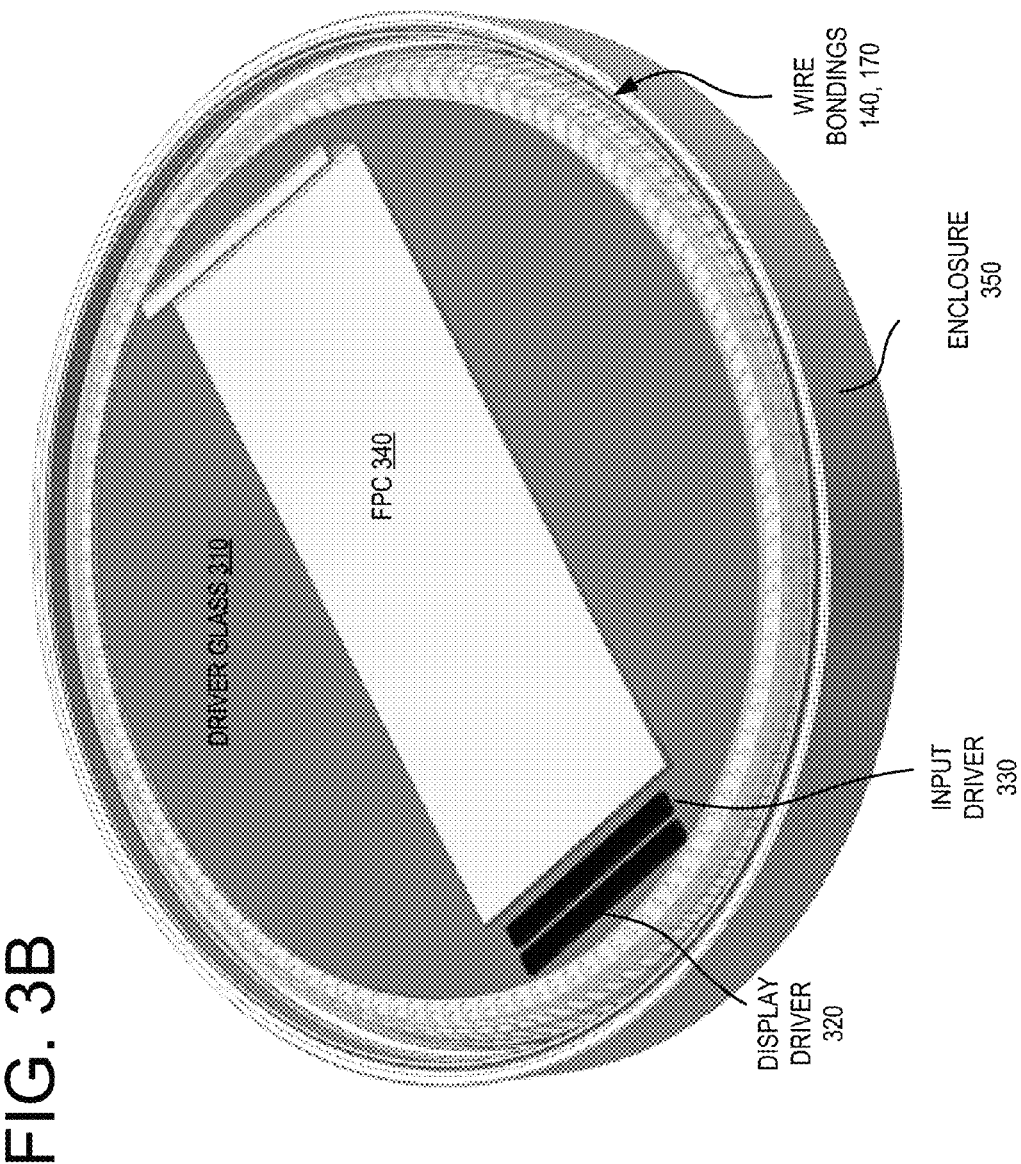
FIG. 3B shows a bottom view of the LCD module shown in FIG. 3A.

The following detailed description refers to the accompanying drawings. The same reference numbers in different drawings may identify the same or similar elements.

FIGS. 1A-1E illustrate cross-sectional views of liquid crystal display (LCD) module 100 (labeled as LCD module 100-A in FIG. 1A, LCD module 100-B in FIG. 1B, LCD module 100-C in FIG. 1C, LCD module 100-D in FIG. 1D, and LCD module 100-E in FIG. 1E) in which concepts described herein may be implemented. As shown in FIGS. 1A-1D, LCD module 100 may include a color filter (CF) layer 110, a thin film transistor (TFT) layer 120, a control layer 130, and first wire bondings 140 within a border 103. In particular, CF layer 110 and TFT layer 120 coordinate to provide an active display region 101 that outputs visual content toward a user 102, and control layer 130 may be positioned under (e.g., in the opposite direction of active display region 101) TFT layer 120. First wire bondings 140 may connect control layer 130 to TFT layer 120 to enable display controlling components within control layer 130 to manage transistors included in TFT layer 120.

CF layer 110 may include pixels that transmit different colored light output upward toward various regions of active display region 101 (as used herein, the terms "up," "upward," "top," etc., are intended to indicate a direction that the light is outputted by CF layer 110 toward active display region 101, whereas the terms "down," "downward," "bottom," etc. are intended to indicate an opposite direction associated with viewing active display region 101). For example, CF layer 110 may include red, green, and blue liquid crystals that modify light energy generated by a light source (not shown), such as edge light emitting diodes (LEDs) positioned at the peripheral edge of CFL layer 110 and/or an emissive light such as organic LEDs positioned between CF layer 110 and TFT layer 120. CF layer 120 may include a glass substrate (or panel) on which the liquid crystals for the pixels are formed.

To form CF layer 120, the glass substrate may be cleaned and coated with a transparent conductive layer, such as Indium-Tin Oxide Film (ITO), for electrostatic screening. To create red pixels, a light-sensitive red material (also known as red photo-resist) may be applied to the glass substrate, and a mask in a desired shape for the red pixel may be applied over the red material. Light may be applied to the resulting structure to remove exposed portions of the red material. The mask material may be removed (e.g., through etching), and the remaining red material may be hardened by heating the resulting structure to form red pixels. This process may be repeated using blue and green materials to form the blue and green pixels. Further processing may be preformed to add different additional layers and materials for different types of CF films. For example, pixels of different colors may be formed at heights, and a laminating layer may be applied to even out the surface of the pixels.

TFT layer 120 may include TFTs. TFTs are a type of field-effect transistors that are produced by depositing thin films of an active semiconductor layer, a dielectric layer, and metallic contacts over a supporting (but non-conducting) substrate, such as a glass substrate (or panel). For example, the a dielectric layer may include a thin film of amorphous or polycrystalline silicon deposited over the glass substrate using a deposition process, such as plasma-enhanced chemical vapor deposition (PECVD), and the silicon film may be shaped using various techniques to produce the TFT. A TFT may generate an electrical field for driving and aligning liquid crystals within an adjacent portion of CF layer 110, and the TFTs within TFT layer 120 may be arranged such that electrical fields can be selectively generated and controlled to manipulate the colored pixels across CF layer 110 to produce a desired image through active display region 101.

As described in greater detail below in the discussion of FIGS. 2A and 2B, transistors in TFT layer 120 may be connected by rows and columns of conductive material, such as the silicon film or metal lines and by metal contacts connected to the conductive materials. In this way, transistors within TFT layer 120 may be addressed in rows and columns, rather than individually, to reduce the potential number of connections within TFT layer 120. A one-way current passing characteristic of a transistor may prevent a charge that is being applied to the transistor via a row or column conductor from being drained between refreshes to a display image. As described in greater detail below, first wire bindings 140 may attach to columns and/or to rows within TFT layer 120 to enable a charge to be selectively applied to each row or column of the TFTs.

CF layer 110, TFT layer 120, and/or control layer 130 may be bonded together. For example, an adhesive interconnect system, such as anisotropic conductive film (ACF), may be used to bond CF layer 110, TFT layer 120, and/or control layer 130.

As shown in FIGS. 1A-1D, control layer 130 may be positioned under TFT layer 120 (e.g., in a direction opposite of CF layer 110 and active display region 101). Control layer 130 may include various electronics, driver circuits, control circuits, etc. that may operate to selectively control the TFTs within TFT layer 120. For example, as described in greater detail with respect to FIGS. 3A and 3B, control layer 130 may include a glass substrate (or panel), and controlling electronics (e.g., circuits used to receive/send signals to TFT layer 120 and/or input layer 160 may be mounted on the glass layer using COG (chip-on-glass) technology or conductive paste to couple the electronics to the glass substrate and to electrically connect to electronics to first wire bondings 140.

First wire bondings 140 may provide a path between control layer 130 and TFT layer 120 to enable various controllers/drivers in control layer 130 to provide and/or drive control signals to the TFTs within TFT layer 120. For example, first wire bondings 140 may include metallic pathways between the controllers/drivers in control layer 130 and the conductive rows and/or columns of TFTs within TFT layer 120.

In an implementation shown in FIG. 1A, LCD module 100-A may include first wire bondings 140 that pass through one or more sidewalls 122 of TFT layer 120. For example, construction of TFT layer 120 may include providing conductive material (e.g., silicon film) between the TFTs and a sidewall 122 of TFT layer 120, and wire bonding techniques may be used to connect, as first wire bondings 140, metallic lines to the conductive materials via the sidewall 122. In another example, construction of TFT layer 120 may include trimming and or cutting TFT layer 120 to expose conductive material so that first wire bondings 140 may connect to the conductive materials via the sidewall 122.

As shown in FIG. 1A, LCD module 100-A may further include border 103 that surrounds first wire bondings 140. Border 103 may include a material, such as a glue or an epoxy, to protect first wire bondings 140 from contact and to prevent movement of first wire bondings 140 with respect to TFT layer 120 and/or control layer 130. Border 103 may further serve to redirect light energy toward active display region 101. As further shown in FIG. 1A, lateral portions of TFT layer 120 and control layer 130 do not significantly extend past the lateral portions of CF layer 110. Consequently, active display region 101 may extend substantially to the lateral edges of CF layer 110, and border 103 does not significantly extend over any portions of CF layer 110 or TFT layer 120.

In an implementation of LCD module 100-B shown in FIG. 1B, first wire bondings 140 may pass through a bottom surface 124 (e.g., through the glass substrate) of TFT layer 120. For example, control layer 130 may be relatively smaller than TFT layer 120, and construction of TFT layer 120 may include forming openings through a portion of the glass substrate (e.g., by etching and/or drilling into the glass substrate). The portion of the glass substrate may correspond to a portion of TFT layer 120 that remains exposed when control layer 130 is mounted to TFT layer 120. The openings in the glass substrate may provide access to conductive material (e.g., silicon film) via bottom surface 124, and wire bonding techniques may be used to connect first wire bondings 140 to the exposed conductive material. As illustrated in FIG. 1B, first wire bondings 140 may not extend past the lateral edges of CF layer 110 and/or TFT layer 120, so that border 103 may not be present near CF layer 110 (e.g., LCD 100-B may appear "borderless" to user 102).

In an implementation shown in FIG. 1C, first wire bondings 140 of LCD module 100-C may extend between bottom surface 124 and control layer 130 via one or more adhesive points 150. Adhesive points 150 may include a bonding material, such as ACF, that couples TFT layer 120 and control layer 130. As shown in FIG. 1C, adhesive points 150 may be positioned over a top surface of control layer 130, so that first wire bindings 140 do not extend laterally beyond (e.g., past side surfaces of) TFT layer 120 and/or control layer 130. As further shown in FIG. 1C, this configuration may enable first wire bondings 140 to be routed without the use of border 103 extending beyond the lateral edges of CF layer 110 and/or TFT layer 120. Thus, LCD 100-C may appear "borderless" to user 102. Furthermore, adhesive points 150 may function to protect first wire bondings 140 from inadvertent contact and to prevent movement of first wire bondings 140.

In another implementation shown in FIG. 1D, LCD module 100-D may further include an input layer 160. For example, input layer 160 may include a capacitive touch panel that includes an insulator, such as glass, coated on one or more surfaces with a transparent conductive material, such as ITO. A matrix of rows and columns of conductive material may be layered on one or more sheets of the glass. For example, a single conductive layer may be etched to form a grid pattern of electrodes, or two separate, perpendicular layers of conductive material may be etched with parallel lines or tracks to form a grid. An electrostatic field may be generated in input layer 160 by applying a charge to the conductive material. When user 102 contracts input layer 160, the electrostatic field may be modified, and the modification to the electrostatic field may be measured through capacitance change at different portions of input layer 160. For example, the capacitance change may be measured at intersections in the matrix of rows and columns of conductive material.

Second wire bondings 170 may electrically couple portions of the conductive material to control layer 130. Control layer 130 may use the changes in capacitances to determine a location of the user contact on input layer 160. Second wire bondings 170 may run between control layer 130 and input layer 160 via border 103. Because there may be relatively fewer detection points in input layer 160 than transistors in TFT layer 120, LCD module 100 may include more first wire bondings 140 relative to second wire bondings 170. Consequently, first wire bondings 140 may be present in a greater portion of border 103 relative to second wire bondings 170 in LCD module 100. For example, as described below with respect to FIGS. 2A and 2B, first wire bondings 140 may extend from substantially all lateral portions of TFT layer 120, whereas second wire bondings 170 may laterally extend from a relatively smaller portion of input layer 160.

In an embodiment of LCD module 100-E shown in FIG. 1E, input layer 160 may laterally extend beyond the lateral edge of CF layer 110 so that a bottom surface of input 160 is exposed. Additionally or alternatively, TFT layer 120 may laterally extend beyond the lateral edge of control layer 130 so that TFT bottom surface 124 exposed. First wire bondings 140 may pass through TFT bottom surface 124 (e.g., through the glass substrate) of TFT layer 120, and or second wire bondings 160 may pass through the bottom surface of input layer 160. For example, construction of LCD module 100-E may include forming openings through a portion of glass substrates (e.g., by etching and/or drilling into the glass substrate) in TFT layer 120 and/or input layer 160. The openings in the glass substrate may provide access to conductive material (e.g., silicon film) in TFT layer 120 and/or input layer 160, and wire bonding techniques may be used to connect first wire bondings 140 and/or second wire bonding 170 to the exposed conductive material.

Although FIGS. 1A-1E depict exemplary components of LCD module 100, in other implementations, LCD module 100 may include fewer components, additional components, different components, or differently arranged components than those illustrated in FIGS. 1A-1D. For example, LCD module 100 may further include an optical layer, such as a polarizing filter film, to direct light through or from CF layer 120. Furthermore, one or more components of LCD module 100 may perform one or more tasks described as being performed by one or more other components of LCD module 100. For example, the conductive grid described as being included in input layer 160 may be integrated into CF layer 110.

FIG. 2A shows a top-perspective view of a high density layer 201. For example, high density layer 201 may correspond to TFT layer 120 if viewed down though active display region 101. As shown in FIG. 2A, high density layer 201 may include a glass substrate 200 and intersections 210 of columns 220 (shown in FIG. 2A as columns 220-1, 220-2, 220-3, and 220-4) and rows 230 (shown in FIG. 2A as rows 230-A, 230-B, 230-C, and 230-D) of a conductive material, such as ITO. Intersections 210 in FIG. 2A may correspond to pixels of the LCD module 100.

As further shown in FIG. 2A, columns 220 and rows 230 of conductive material may be connected to wire bonding locations 240. Wire bonding locations 240 may correspond to locations where columns 220 and rows 230 bond or otherwise connect to first wire bondings 140. In high density layer 201 shown in FIG. 2A, wire bonding locations 240-1, 240-2, 240-3, and 240-4 connect, respectively, to columns 220-1, 220-2, 220-3, and 220-4; and wire bonding locations 240-A, 240-B, 240-C, and 240-D connect, respectively, to rows 230-A, 230-B, 230-C, and 230-D. A separate wire bonding 140 may be connected to each of columns 220 and rows 230.

As previously described, each intersection 210 in TFT layer 120 may be connected to a transistor (such as a TFT), and control layer 130 may forward control signals to selectively activate the transistor to control corresponding pixels in CF layer 110. For example, TFT layer 120 may send a control signal to a transistor located at a particular intersection 210 by forwarding the control signal, via first wire bondings 140, to a first wire bonding location 240 coupled to a respective row 230 associated with the particular intersection 210 and a second wire bonding location 240 coupled to a respective column 220 associated with the particular intersection 210.

As shown in FIG. 2A, glass substrate 200 may have a substantially round shape, and wire bonding locations 240 may be positioned around the lateral edges of glass substrate 200. For example, wire bonding locations 240 may be positioned on alternating columns 220 and rows 230 so that wire bonding locations 240 are spaced substantially around the perimeter of glass substrate 200. For example, wire bonding locations 240-1 and 240-3 are shown on a top edge of glass layer 200, and wire bonding locations 240-2 and 240-4 are shown on a bottom edge of glass layer 200, opposite wire bonding locations 240-1 and 240-3. Furthermore, wire bonding locations 240-A and 240-C are shown on a left edge of glass layer 200, and wire bonding locations 240-B and 240-D are shown on a right edge of glass layer 200 opposite of wire bonding locations 240-A and 240-C.

FIG. 2B shows a top view of a low density layer 202. For example, low density layer 202 may correspond to input layer 160 when viewed in the direction of active display region 101. As shown in FIG. 2B, low density layer 202 may also include a glass substrate 200 and intersections 210 of columns 220 (shown in FIG. 2B as columns 220-1 and 220-2) and rows 230 (shown in FIG. 2B as rows 230-A and 230-B) of a conductive material, such as ITO. As previously described, each intersection 210 in input layer 160 may include a component to forward, via second wire bondings 170, indications of changes in capacitance to control layer 130.

As with high density layer 201 in FIG. 2A, low density layer 202 may also include wire bonding locations 240 connected to columns 220 and rows 230. Wire bonding locations 240 may correspond to locations where columns 220 and rows 230 bond or otherwise connect to second wire bondings 160. In low density layer 202 shown in FIG. 2B, wire bonding locations 240-1 and 240-2 connect, respectively, to columns 220-1 and 220-2; and wire bonding locations 240-A and 240-B connect, respectively, to rows 230-A and 230-B. A separate wire bonding 140 may be connected to each of columns 220 and rows 230 included in low density layer 202.

As shown in FIG. 2B, glass substrate 200 in low density layer 202 may have a substantially round shape, and wire bonding locations 240 may be positioned on a portion of the lateral edge of glass substrate 200. For example, wire bonding locations 240-1, 240-2, 240-A, and 240—are shown on a top edge of glass layer 200. In this way, second wire bondings 170 may connect to less than a quarter a round shape (ninety degrees) associated with low density layer 202.

Although FIGS. 2A and 2B depict exemplary components of high density layer 201 and low density layer 202, in other implementations, high density layer 201 and low density layer 202 may include fewer components, additional components, different components, or differently arranged components than those illustrated in FIGS. 2A and 2B. For example, high density layer 201 and low density layer 202 may include conductive material that is configured in a different shape or orientation (e.g., not in columns 220 or rows 230). Furthermore, one or more components of high density layer 201 and low density layer 202 may perform one or more tasks described as being performed by one or more other components of high density layer 201 and low density layer 202.

FIG. 3A show a cross-sectional view of control layer 130. As shown in FIG. 3A, control layer 130 may include, for example, driver glass 310, a display driver 320, an input driver 330, and flexible printed circuit (FPC) 340. Driver glass 310 may include a glass layer (or substrate) and a conductive material, such as ITO. Display driver 320, input driver 330, and FPC 340 may be bonded to driver glass 310. For example, display driver 320, input driver 330, and FPC 340 may be attached to driver glass 310 using a tape automatic bonding (TAB) method or may be mounted on driver glass 310 using a chip on glass (COG) method.

The conductive material in driver glass 310 may provide electrical current paths between display driver 320 and first wire bondings 140, and electrical current paths between input driver 330 and second wire bondings 170. Display glass 310 may route signals from display driver 320, input driver 330, and/or FPC 340 to connection points (e.g., connections points 240 shown in FIGS. 2A and 2B) located at a perimeter of display glass 310 for connection to first wire bondings 140 and/or second wire bonding 170. For example, display driver 320 may receive, via display glass 310, drive signals generated by FPC 340, and display driver 320 may selectively forward the drive signals, via first wire bondings 140, to certain transistors within TFT layer 120 to cause CF layer 110 to generate a desired image. In another example, input driver 330 may receive, via display glass 310, drive signals generated by FPC 340 and may provide, via second wire bondings 170, the drive signals to input layer 160 to cause capacitance in detection points in within input layer 160. Input driver 330 may further receive, via second wire bondings 170, signals from detection points in input layer 160, and may process changes in capacitance values at these detection points to detect a user input. Attaching first wire bondings 140 and/or second wire bondings 170 around the perimeter of display glass in the manner shown may help reduce the size of border 103 (shown in FIGS. 1A and 1D).

In another implementation not shown in FIG. 3A, display driver 320 and/or input driver 330 may be mounted on FPC 340 and/or included as a component of FPC 340. For example, display driver 320 and/or input driver 330 may be integrated into logic circuits included in FPC 340.

FIG. 3B shows a bottom view of LCD module 100 (e.g., looking at control layer 103 and an opposite direction of active display region 101). As shown in FIG. 3B, LCD module 100 may be housed in an enclosure 350, and display driver 320, input driver 330, and FPC 340 may be mounted to a bottom surface of driver glass 310. As further shown in FIG. 3B, display glass 310 may have a substantially circular shape, and first wire bondings 140 and/or second wire bondings 170 may attach driver glass 310 substantially around its circular perimeter. For example, enclosure 350 may be included in a watch or a personal device, such as a fitness monitor.

Figure 3C:
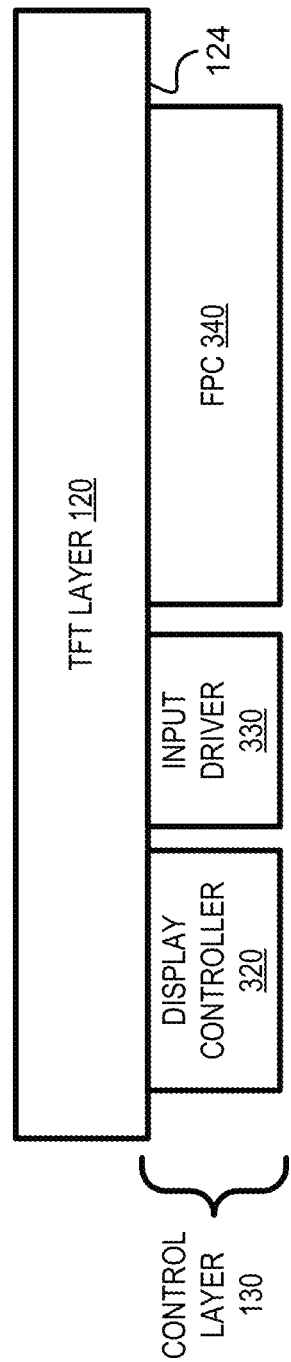
FIG. 3C show a cross-sectional view of a control layer that may be included in the LCD module of FIGS. 1A-1D according to another implementation.

FIG. 3C show a cross-sectional view of control layer 130 in another implementation. In the example shown in FIG. 3C, control layer 130 does not include driver glass 310. Instead, display driver 320, input driver 330, and/or FPC 340 may be bonded to TFT layer 120. For example, display driver 320, input driver 330, and/or FPC 340 may be mounted on bottom surface 124 of TFT layer 120.

Although FIGS. 3A-3C depict exemplary components of control layer 130, in other implementations, control layer 130 may include fewer components, additional components, different components, or differently arranged components than those illustrated in FIGS. 3A-3C. Furthermore, one or more components of control layer 130 may perform one or more tasks described as being performed by one or more other components of control layer 130. For example, functions associated with display driver 320 and/or input driver 330 may be performed by FPC 340.

FIG. 4 is a schematic diagram illustrating exemplary components of a device 400 that may include LCD module 100. Device 400 may include, for example, a wristwatch, a television, camera, computer display, a mobile communications device such as a smart phone, handheld video game device, a music playing device, a laptop or tablet computer, a book reader, a wearable computing device, etc. As illustrated in FIG. 4, device 400 may include a bus 410, a processing unit 420, a main memory 430, a read-only memory (ROM) 440, a storage device 450, an input device 460, an output device 470, and/or a communication interface 480.

Bus 410 may include a path that permits communication among the components of device 400. Processing unit 420 may include one or more processors, microprocessors, or other types of processing units that may interpret and execute instructions. Main memory 430 may include a random access memory (RAM) or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to device 400, such as a keyboard, a mouse, a pen, a microphone, voice recognition and/or biometric mechanisms, etc. For example, input device 460 may include touch layer 160 of LCD module 100. Output device 470 may include a mechanism that outputs information to the operator, including a display, a printer, a speaker, etc. For example, LCD module 100 may be included in output device 470.

Communication interface 480 may include any transceiver that enables device 400 to communicate with other devices and/or systems. For example, communication interface 480 may include mechanisms for communicating with another device or system via a network. For example, if user device 110 is a wireless device, such as a smart phone or a wearable computing device such as a smart watch, communication interface 480 may include, for example, a transmitter that may convert baseband signals from processing unit 420 to radio frequency (RF) signals and/or a receiver that may convert RF signals to baseband signals. Alternatively, communication interface 480 may include a transceiver to perform functions of both a transmitter and a receiver. Communication interface 480 may further include an antenna assembly for transmission and/or reception of the RF signals, and the antenna assembly may include one or more antennas to transmit and/or receive RF signals over the air.

As described herein, device 400 may perform certain operations in response to processing unit 420 executing software instructions contained in a computer-readable medium, such as main memory 430. A computer-readable medium may be defined as a non-transitory memory device. A memory device may include space within a single physical memory device or spread across multiple physical memory devices. The software instructions may be read into main memory 430 from another computer-readable medium or from another device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than those depicted in FIG. 4. Alternatively, or additionally, one or more components of device 400 may perform one or more other tasks described as being performed by one or more other components of device 400.

FIG. 5 shows an exemplary user device 500, such as a wristwatch, that may include LCD module 100. Because, as shown in FIGS. 1A-1D, no portion of TFT layer 120 extends laterally beyond the edges of CF layer 110 in display module 100, LCD module 100 may help user device 500 make maximum use of the display surface and appear borderless. For example, as shown in FIG. 5, user device 500 may appear substantially borderless in that that active display region 101 extends substantially to the sides of enclosure 350. In other words, no significant portion of the top surface of CF layer 100 is covered by enclosure 350.

Although FIG. 5 shows user device 500 and active display region 103 as having a substantially circular or oval shape, in other implementation, user device 500 and active display region 103 may be associated with other shapes, such as a rectangle, triangle, hexagon, octagon, semi-circle, etc. Consequently, it should be appreciated that one or more components of LCD module 100 may also be associated with a circular, oval, or other shape.

It will be apparent that systems, device, and methods, as described above, may be implemented in many different forms of software, firmware, and hardware in the implementations illustrated in the figures. The actual software code or specialized control hardware used to implement these systems, device, and methods is not limiting of the implementations. Thus, the operation and behavior of the systems, device, and methods were described without reference to the specific software code—it being understood that software and control hardware can be designed to implement the systems, device, and methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the terms "comprises" and "comprising," when used in this specification, are taken to specify the presence of stated features, integers, steps or components but do not preclude the presence or addition of one or more other features, integers, steps, components or groups thereof.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a color filter (CF) layer that includes a plurality of pixels, wherein the plurality of pixels are configured to modify light energy to form a display image;
    a transistor layer that includes a first glass panel, conductive pathways, and a plurality of transistors coupled to the conductive pathways, wherein the plurality of transistors are configured to control the plurality of pixels;
    a control layer located below the transistor layer, wherein the control layer includes a display controller configured to generate signals to control the plurality of transistors; and first wire bondings configured to carry the signals between the display controller and the conductive pathways included in the transistor layer; and wherein the CF layer, the transistor layer and the control layer are in stacked relationship and a longitudinal axis of the device traverses at least the CF layer and the transistor layer, a radial sidewall of the transistor layer is generally parallel to the longitudinal axis; and wherein the first wire bondings couple to the conductive pathways by connection to conductive material of the transistor layer that is exposed on the radial sidewall of the transistor layer.

2. The device of claim 1, wherein the transistors are thin film transistors (TFTs).

3. The device of claim 1, wherein the conductive pathways include rows and columns, the transistors are positioned at intersections of the rows and the columns, and each of the rows and the columns are coupled to a corresponding one of the first wire bondings.

4. The device of claim 1, wherein the device further includes a border around the transistor layer and the control layer, and wherein the first wire bondings pass through the border.

5. The device of claim 4, wherein the border includes an epoxy.

6. The device of claim 1, wherein the transistor layer has a round or oval shape, and wherein the first wire bondings are disposed at a plurality of locations around the perimeter of the transistor layer.

7. The device of claim 1, further comprising:
an input layer configured to generate signals associated with a user input, wherein the input layer is located above the CF layer;
an input driver included in the control layer, wherein the input driver is configured to process the signals associated with the user input; and
second wire bondings configured to carry the signals between the input layer and the control layer.

8. The device of claim 7, wherein the input layer is associated with a capacitive touch screen, wherein the signals relate to changes in capacitances of the touch screen at different location based on the user input, and wherein the input driver analyzes the changes in capacitances to determine a location of the user input on the touch screen.

9. The device of claim 7, wherein the input layer includes rows and columns of conductive materials, and each of the rows and the columns are coupled to a corresponding one of the second wire bondings.

10. The device of claim 7, wherein the input layer has a round or oval shape, and wherein the second wire bondings are disposed at one portion of a perimeter of the input layer.

11. The device of claim 1, wherein the control layer further includes a second glass panel, and wherein the display controller is mounted to the second glass panel.

12. The device of claim 1, wherein control layer further includes a flexible printed circuit (FPC) configured to generate drive signals, and wherein the display controller is further configured to selectively forward the drive signals to the transistors.

13. A user device comprising:
a display module, wherein the display module includes:
a color filter (CF) layer that includes a first glass panel and a plurality of pixels coupled to the first glass panel, wherein the plurality of pixels form a display,
a transistor layer that includes a second glass panel, conductive pathways, and a plurality of transistors coupled to the conductive pathways, wherein the plurality of transistors are configured to control the plurality of pixels,
a control layer located below the transistor layer, wherein the control layer includes a display controller configured to generate signals to selectively activate the plurality of transistors, and
first wire bondings configured to carry the signals between the display controller and the conductive pathways included in the transistor layer; and
wherein the CF layer, the transistor layer and the control layer are in stacked relationship and a longitudinal axis of the user device traverses at least the CF layer and the transistor layer, a radial sidewall of the transistor layer is generally parallel to the longitudinal axis; and
wherein the first wire bondings couple to the conductive pathways by connection to conductive material of the transistor layer that is exposed on the radial sidewall of the transistor layer; and
an enclosure to house the display module.

14. The user device of claim 13, wherein the conductive pathways include rows and columns, the transistors are positioned at intersections of the rows and the columns, and each of the rows and the columns are coupled to a corresponding one of the first wire bondings.

15. The user device of claim 13, wherein the display module further comprises:
an input layer configured to generate signals associated with a user input and provide touch screen functionality;
an input driver included in the control layer, wherein the input driver is configured to process the signals associated with the user input to determine a location of the user input on the display module; and
second wire bondings configured to carry the signals between the input layer and the control layer.

16. The user device of claim 13, wherein the display is borderless within the enclosure.

17. A device comprising:
an input layer configured to generate signals associated with a user input;
a color filter (CF) layer that includes a plurality of pixels, wherein the plurality of pixels are configured to modify light energy to form a display image, and wherein the CF layer is located below the input layer;
a transistor layer that includes a substrate, conductive pathways, and a plurality of transistors coupled to the conductive pathways, wherein the plurality of transistors are configured to control the plurality of pixels;
a control layer located below the transistor layer, wherein the control layer includes a display controller configured to generate signals to control the plurality of transistors;
first wire bondings configured to carry the signals between the display controller and the conductive pathways included in the transistor layer; and
second wire bondings configured to carry the signals between the input layer and the control layer; and
wherein the input layer, the CF layer, the transistor layer and the control layer are in stacked relationship and a longitudinal axis of the device traverses at least the input layer, the CF layer and the transistor layer, a radial sidewall of the input layer is generally parallel to the longitudinal axis and a radial sidewall of the transistor layer is generally parallel to the longitudinal axis;

wherein the first wire bondings couple to the conductive pathways by connection to conductive material of the transistor layer that is exposed on the radial sidewall of the transistor layer; and wherein the second wire bondings connect to the input layer on the radial sidewall of the input layer.

\* \* \* \* \*